E. A. WALL.
ORE CONCENTRATING TABLE.
APPLICATION FILED OCT. 16, 1916.
1,233,149.
Patented July 10, 1917.
2 SHEETS—SHEET 1.
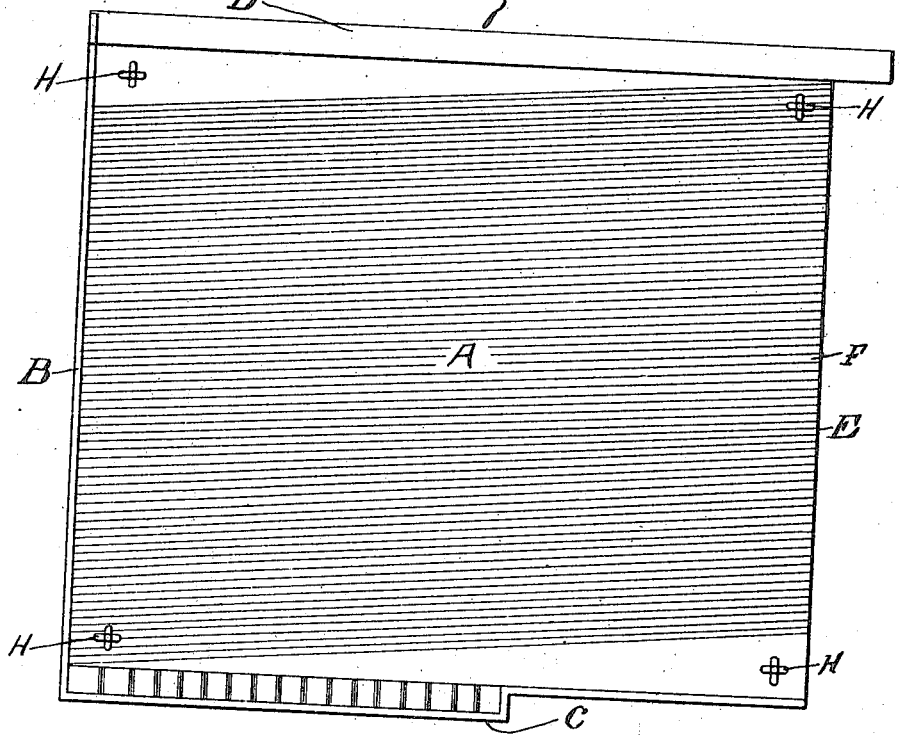
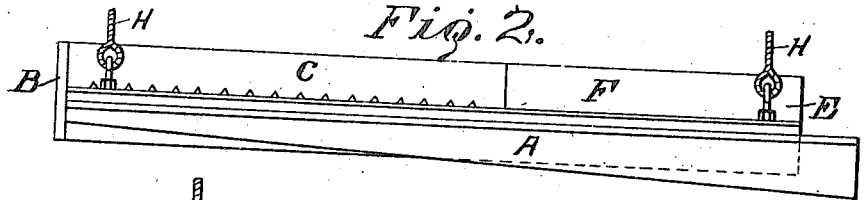
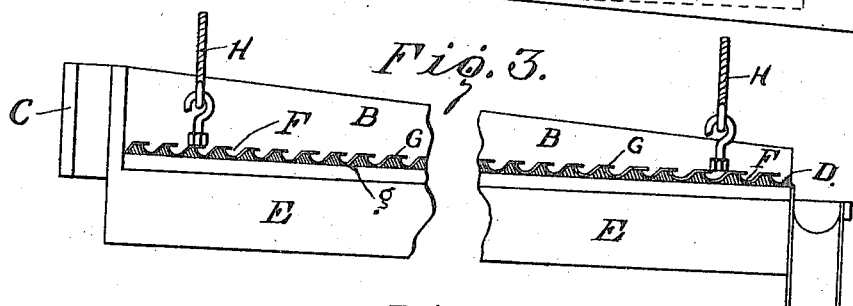
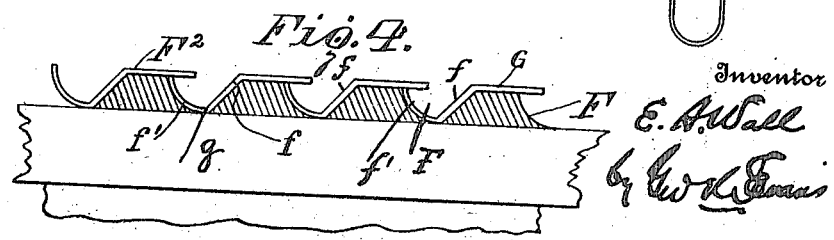

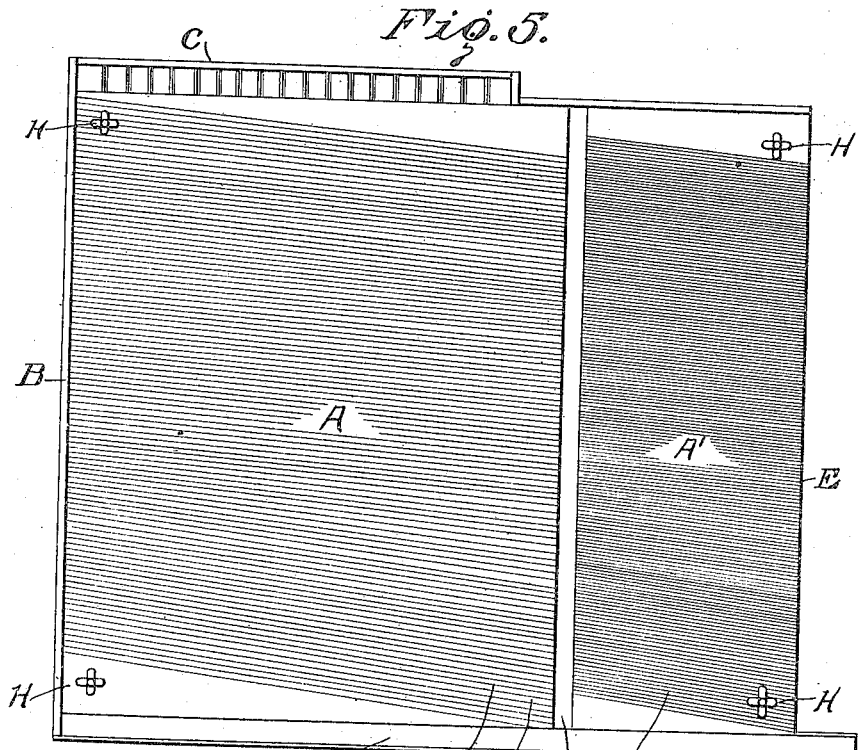

UNITED STATES PATENT OFFICE.

ENOS A. WALL, OF SALT LAKE CITY, UTAH.

ORE-CONCENTRATING TABLE.

1,233,149.      Specification of Letters Patent.      Patented July 10, 1917.

Application filed October 16, 1916. Serial No. 125,981.

*To all whom it may concern:*

Be it known that I, ENOS A. WALL, a citizen of the United States, residing at Salt Lake City, in the county of Salt Lake and State of Utah, have invented certain new and useful Improvements in Ore-Concentrating Tables, of which the following is a specification.

The object of my invention is to provide an ore concentrating table adapted to receive finely crushed mineral bearing ore or rock and separate the valuable mineral contents from the waste or barren rock or earthy matter associated therewith; and especially adapted to recover from the waste material the more finely divided particles of mineral or so-called slimes at the same time and by the same operation by which the coarser grained mineral contents of the rock are likewise recovered from the waste material.

In order to avoid agitation or disturbance of the mineral concentrates, after they shall have become settled within the channels, it is necessary that the lower walls, that is, the walls of the channels nearest the tailings discharge side of the table, be inclined in the direction of the flow of wash water at any angle oblique to the angle of impact of the water, thereby causing the force of the flow of water to be deflected upward and away from the lower portion of the channel. By this means it will be seen that an eddy of comparatively quiescent water will be formed in the bottom of the channel and against the upper wall thereof, within which the concentrated mineral will be retained free from disturbance by the overflowing wash water. In order to provide more ample space within which the concentrated mineral can thus be retained, the upper wall of the channel should be perpendicular to the surface of the table, or inclined downward from the perpendicular in direction of the feed side of the table.

In my invention I have provided a series of parallel channels extending longitudinally of the table and having their walls constructed as last above stated, but, in addition and in order to provide additional space for retention of the concentrated mineral in the bottom of the channel and against the upper wall thereof, I have provided a hood or cover composed of thin sheet metal or other suitable material, which extends from the upper wall out over the channels approximately one-third of their breadth. By this means a uniformly smooth surface is provided upon and over which the waste water is induced to flow in even current and without interruptions from projecting walls of the channel, thus affording opportunity for the smallest as well as the coarser particles of mineral to settle into the channels, and within which disturbance or agitation by the overflowing wash water is impossible.

In concentration of complex ores, such as galena, zinc and iron sulfids combined, it is frequently desirable to separate the several mineral concentrates from each other. To accomplish this it requires a different form of table surface, and for this purpose a plain surface is usually employed; but I have found that more satisfactory results can be obtained by using a slightly fluted, corrugated or wave-like surface, in which the flutes or corrugations have low receding walls, so as to permit retention of the heavier minerals in the depressions and removal of the lighter minerals down the inclined surface and across the depressions by a gentle flow of water; and, in order to accomplish the separation of heavier from the lighter minerals in the same operation, I have provided the main table and channels shown in Figure 1 supplemented by a longitudinal extension provided with a corrugated surface.

These objects I accomplish by the construction shown in the accompanying drawings, in which:

Fig. 1 is a plan of an ore concentrating table with my improvements applied.

Fig. 2 is a side elevation thereof.

Fig. 3 is a sectional end elevation.

Fig. 4 is a detail view in cross section of the channels and hoods.

Fig. 5 is a plan of the table shown in Fig. 1 with an extension containing smaller channels.

Fig. 6 is a side elevation of the table shown in Fig. 5, showing both series of channels in their true relation.

Fig. 7 is a foot end elevation of the table shown in Fig. 5, showing the terminal ends of the two series of the channels.

Fig. 8 shows the smaller channels I full size.

Fig. 9 shows a modified form of hood.

A designates the table provided with channels extending from the head end B to the foot or mineral concentrate or discharge end E. C designates the right or feed side of the table and D is the tailings or wash-water discharge side thereof. H designates fragments of the suspension ropes or flexible supports which permit frictionless reciprocation of the table. F designates the grooves or channels which extend from end to end of the table in parallel relation and at an angle from the side C toward the tailings or wash water discharge side D. G designates the hoods which overlap the right or feed sides of the channels F and are formed of thin sheet metal or other suitable material. These hoods G extend about one-third the distance across the channels F and lie in the same plane so as to form a uniformly smooth surface upon and over which the wash water and sands will flow in an even current and without interruptions from any projecting channel walls. Thus opportunity is afforded for the smallest as well as the largest particles of mineral to settle in the channels F, within which disturbance or agitation by the overflowing wash water is impossible.

In order to render such agitation or disturbance of the mineral concentrates impossible after they have settled within the channels, it is necessary that the lower walls of the channels, that is, the walls $f$ nearest the tailings discharge side D, be inclined at any suitable angle in the direction of the flow of wash water, thereby causing the force of the flow of water to be deflected upward and away from the lower portions or bases of the channels. By this means it will be seen that an eddy of comparatively quiescent water will be formed in the bottom of the channel F and against the upper wall or feed side $f'$ thereof, within which the concentrated mineral will be retained free from disturbance by the overflowing wash water.

In order to provide ample space within which the concentrated mineral may thus be retained, the upper walls $f'$ at the feed sides of the channels F should be perpendicular to the surface of the table or inclined downward from the perpendicular in the direction of the feed side C of the table. The hoods G are formed integrally with grooved extensions $g$, which constitute the linings of the channels.

In the concentration of complex ores, such as galena, zinc and iron sulfids combined, it is frequently desirable to separate the several mineral concentrates from each other. To accomplish this it requires a different form of table surface and for such purpose a plain surface is usually employed. I have found that more satisfactory results will follow the use of a slightly fluted, corrugated or wave-like surface in which the flutes or corrugations have low receding walls, so as to permit retention of the heavier minerals in the depressions and removal of the lighter numerals down the inclined surface of the table and across the depressions by a gentle flow of water, and, in order to accomplish the separation of the heavier from the lighter mineral concentrates in the same apparatus, I have provided an extension A' to the concentrate discharge end E of the table A, the upper surface of which extension is on a lower level than the upper surface of the main table A and is provided with a corrugated surface I of sheet metal or other suitable material. The channels in surface I are much smaller than the channels F and are connected with the mineral discharge end thereof by an inclined surface J which is at the juncture of the higher surface of table A, with the lower surface of the extension A', as clearly shown in Fig. 5. This inclined surface J inclines downward toward the smaller channels I, in order to facilitate the flow of the product from the larger channels F. The table will be operated by any suitable mechanism, not shown.

Referring to Fig. 9, it will be seen that the channels F are formed by the angle hoods G' having parallel oppositely extending flanges connected by an inclined intermediate portion, the sides of said intermediate portions forming the inclines $f^2$ $f^3$ corresponding to the same parts $f$ $f'$ in the other figures. The lower flanges $f^4$ of the hoods G form the bottoms or bases of the channels F.

What I claim is:

1. An ore concentrating table of the longitudinally differentially reciprocating type formed of a series of flat topped sections, each section having all its top surface in a plane common to all, and provided with parallel channels intermediate the sections extending from the head to the foot end of the table and open at the said foot end for the continuous discharge of the mineral concentrates; the said channels being of the same depth and width throughout and having their lower side walls inclined from the bottoms of the channels outward from end to end at an angle oblique to the flow of the wash water.

2. An ore concentrating table of the longitudinally differentially reciprocating type provided on its upper surface with a series of parallel channels extending from the head to the foot end of the table and open at their foot ends for the continuous discharge of the mineral concentrates, and hoods forming the upper surface of the table and projecting at one longitudinal edge over the upper sides of the channels and extending throughout the length of said channels, all portions of each hood member lying in a plane common to all the hoods of a table section.

3. An ore concentrating table of the longitudinally differentially reciprocating type provided on its upper surface with a series of parallel channels extending from end to end of the table and open at the foot end thereof; the said channels being of the same depth and width from end to end and having their lower side walls inclined outward from end to end in the direction of the flow of the wash water, and hoods forming the upper surface of the table, and projecting over the upper side walls of the channels from end to end thereof, all portions of each hood member lying in a plane common to all the hoods of a table section.

4. An ore concentrating table of the longitudinally differentially reciprocating type provided on its upper surface with a series of parallel channels extending from end to end thereof and open at the foot end of the table; the said channels being formed of angle plates having flat upper hood forming members all of each lying in the same plane common to each member and forming the flat upper surface of the table, and extensions forming the channels proper; the lower members of the extensions forming the lower walls of the grooves being inclined outwardly at an angle oblique to the flow of the wash water and to the surface of the table and the upper members of the extensions underlying the hood forming members.

5. An ore concentrating table of the longitudinally differentially reciprocating type provided on its upper surface with a series of parallel channels extending from end to end thereof and open at the foot end of the table; the said channels being formed of angle plates having oppositely extending upper and lower flat members connected by an intermediate member inclined in the direction of the flow of the wash water; the lower flat members being arranged edge to edge in the same plane and forming the bottoms of the channels which are overhung by the free edges of the upper flat hood-forming members.

6. An ore concentrating table of the longitudinally differentially reciprocating type provided on its upper surface with a series of parallel channels extending from end to end of the table and open at the foot end thereof for the continuous discharge of the mineral concentrates, hoods forming the upper surface of the table, projecting at one longitudinal edge over the upper sides of the channels and extending from end to end thereof; the lower walls of the channels being inclined outward from end to end in the direction of the flow of the wash water, in combination with a lower table surface, having parallel longitudinal channels on its upper face to receive and further treat the product of the first mentioned channels and a plain, surfaced incline leading from the foot of the main or first named channels to the head ends of the second named channels; said inclined portion serving to thoroughly spread out the material leaving the first named channels.

In testimony whereof I affix my signature.

ENOS A. WALL.

Copies of this patent may be obtained for five cents each, by addressing the "Commissioner of Patents, Washington, D. C."